United States Patent [19]
Schroeder et al.

[11] Patent Number: 6,149,308
[45] Date of Patent: Nov. 21, 2000

[54] LINEAR RAIL SYSTEM HAVING PRELOAD ADJUSTMENT APPARATUS

[75] Inventors: Robert Schroeder; Tony Lamarca, both of Rockford, Ill.

[73] Assignee: Pacific Bearing Company, Rockford, Ill.

[21] Appl. No.: 09/211,524

[22] Filed: Dec. 14, 1998

[51] Int. Cl.[7] ........................................ F16C 29/04
[52] U.S. Cl. ........................ 384/50; 384/57; 384/58
[58] Field of Search ............................ 384/50, 53, 54, 384/55, 57, 58

[56] References Cited

U.S. PATENT DOCUMENTS

| | | | |
|---|---|---|---|
| 3,661,431 | 5/1972 | Wisecarver | 384/55 |
| 4,390,216 | 6/1983 | Mueller et al. | 384/54 |
| 5,440,999 | 8/1995 | Dallman et al. | 109/24.1 |
| 5,820,269 | 10/1998 | Ariga | 384/53 |
| 5,906,439 | 5/1999 | Lin | 384/53 |

*Primary Examiner*—Thomas R. Hannon
*Attorney, Agent, or Firm*—Leydig, Voit & Mayer, Ltd.

[57] ABSTRACT

A linear rail system for adjusting the preload no the individual rollers of the slider body provides a linear rail of the type having upper and lower parallel raceways through which a slider body having a number of rollers attached thereto is adapted to axially translate. The rollers are assured contact with the upper and lower raceways while also providing the ability to absorb shocks placed on the slider body. At least one of the rollers is mechanically biased against one of the raceways while at least one other roller is adjustable and fixable in position using an adjustment block.

20 Claims, 7 Drawing Sheets

LINEAR RAIL SYSTEM HAVING PRELOAD ADJUSTMENT APPARATUS

FIELD OF THE INVENTION

The present invention generally relates to sliding mechanisms, and more particularly relates to linear sliding mechanisms employing rollers which ride upon rails.

BACKGROUND OF THE INVENTION

Linear slides are used for literally thousands of applications. Some of the most basic applications are found in conventional furniture drawers wherein the linear slide is the mechanism upon which the drawers slide relative to the desk, countertop, or the like. In addition to such furniture applications, linear slides are used in a number of industrial settings, particularly in conjunction with machine tools. Very often a machine bed will need to slide axially back and forth as the machining operation is performed.

With regard to the machine tool application, it can therefore readily be seen by one of ordinary skill in the art that the linear slide mechanism must be fabricated to move along an axis with practically no play or deflection away from the axis of the linear slide. Any such play or movement would necessarily detrimentally effect the machining operation in that the machining operation is typically computer controlled, and any movement in the linear slide mechanism would therefore result in mis-alignment of the machine tool and the workpiece.

With that stated as a background, it can be seen that one possible option would be to fabricate the linear slide mechanism such that the axis of the linear slide maintains a very tight tolerance relative to a desired axis. In other words, the rails of the slide can be manufactured such that a constant distance is maintained therebetween. However, such an option is obviously difficult to meet and increases the cost of fabrication. Moreover, the rails must be continually adjusted as the machine is used over time due to misalignment resulting from heavy loads or shock loads. In addition, the linear rail system can quite often be deformed due to thermal expansion of the machine as it is repeatedly used.

A need therefore exists for a linear slide system which allows the rollers of the sliding body to maintain constant engagement with the raceways of the rail system to thereby ensure that the sliding body linearly translates across the given axis with substantially no deflection.

SUMMARY OF THE INVENTION

It is therefore a primary aim of the present invention to provide a linear slide system which enables the sliding body of the rail system to axially translate across a given axis with substantially no deflection away from the axis.

It is an objective of the present invention to provide a linear rail system with improved rigidity and structure to thereby maintain accuracy of movement under high stress conditions.

It is another objective of the present invention to provide a linear rail system with means for absorbing shock imparted upon the linear rail due to excessive loads, or abrupt stoppages or reversals of direction.

It is still another objective of the present invention to provide a linear rail system with a mechanism for ensuring parallelism between the opposing raceways of the rail.

In accordance with these aims and objectives, it is a feature of the present invention to provide a sliding rail system wherein a moveable body is adapted for axial translation relative to a rail body having first and second opposed raceways. The moveable body has at least one roller which is biased against a first opposed raceway, at least one second roller which is slidable relative to the second opposed raceway, and adapted to be fixed in position relative to the second opposed raceway.

It is another feature of the present invention to provide the aforementioned linear rail system wherein the first roller mechanically biased against the first opposed raceway is biased using an elastomeric material to thereby provide a shock absorbing device.

It is still another feature of the present invention to provide a linear rail system with a means for monitoring the relative position of the rollers and adjusting the positions of the rollers depending on the disposition of the rollers relative to the first and second opposed raceways.

In accordance with a preferred embodiment of the present invention, it is a feature to provide a sliding rail assembly comprising an elongated channel, a slide adapted to linearly translate across the channel, a plurality of rollers attached to the slide, and a means for adjusting the position of the rollers relative to the channel. The channel has upper and lower parallel raceways with the channel defining an elongated axis. The rollers are attached to the slide and engage the upper and lower raceways to facilitate the linear translation of the slide, while the means for adjusting the rollers ensures engagement of the upper and lower raceways across the length of the channel.

In accordance with another preferred embodiment of the present invention it is a feature to provide a mechanism for adjusting the position of a roller relative to a linear slide having first and second opposed raceways with the linear slide defining a longitudinal axis. The mechanism comprises a slider body adapted to move with the linear slide along the longitudinal axis, a first roller pivotally attached to the slider body by a biasing arm, the biasing arm adapted to generate a force toward the first opposed raceway of the linear slide, a second roller pivotally attached to the slider body by a block fitted within a groove of the slider body, the groove extending transverse to the longitudinal axis, the block adapted to slide within the groove, and a means for securing the block and the slider body groove, the means for securing the block enabling the roller attached to the slider body by the block to be selectively positioned relative to the second opposed raceway.

These and other aims, objectives, and features of the invention will become more apparent from the following detailed description when taken in conjunction with the accompanying drawings.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention as defined by the appended claims.

DETAILED DESCRIPTION OF THE PREFERRED EMBODIMENT

Figure 1:
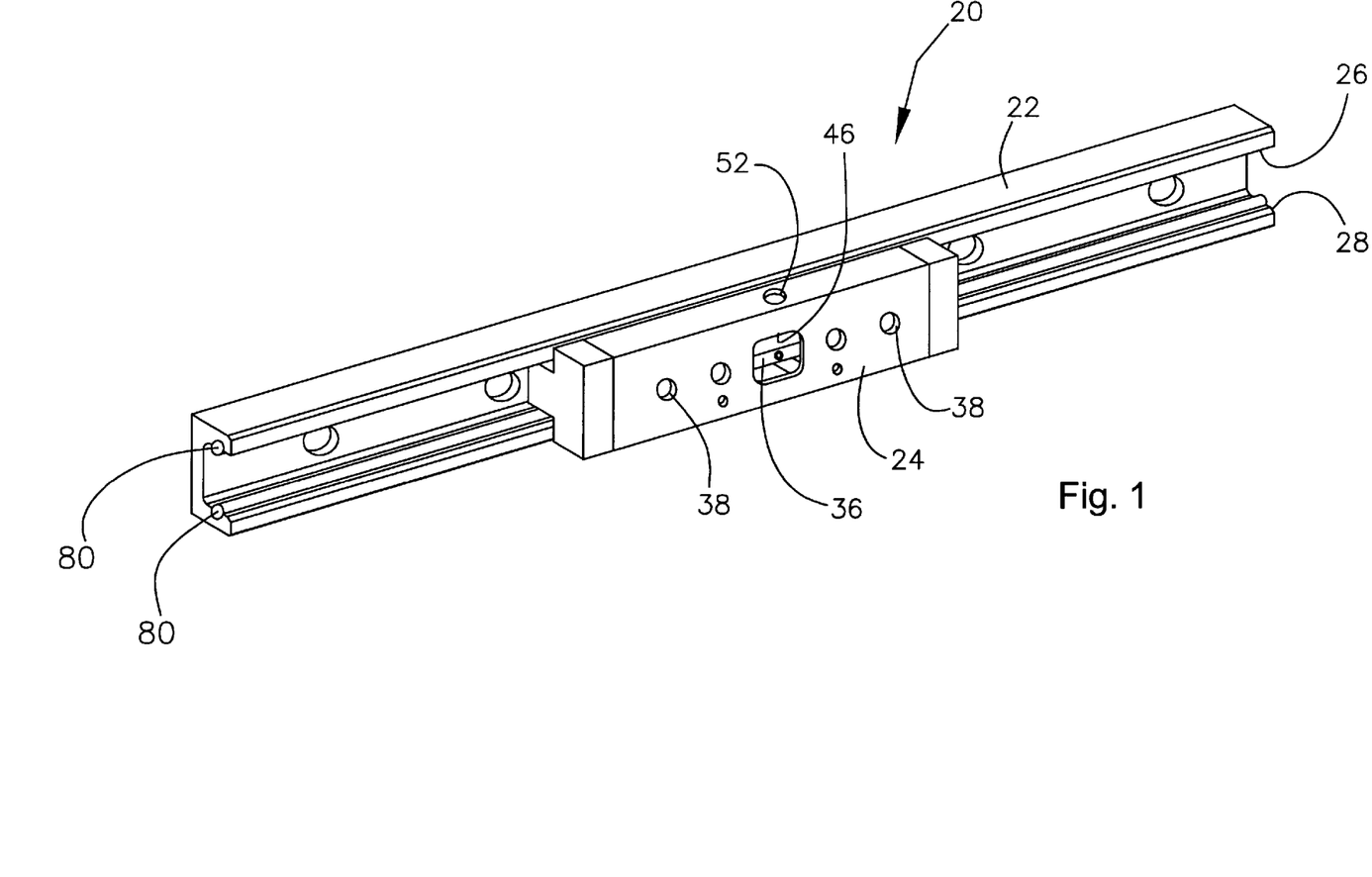
FIG. 1 is a perspective view of the preferred embodiment of the present invention.

Referring now to the drawings and with particular reference to FIG. 1, the preferred embodiment of the present invention is depicted as linear slide system 20. As can be seen from FIG. 1, linear slide 20 primarily consists of linear rail 22 and slider body 24 which is adapted to axially translate across linear rail 22. One of ordinary skill in the art will readily recognize that a pair of linear rails 22 is typically used in most applications and provided in opposing orientation. A platform or other article in need of linear movement can then be attached to the two slider bodies to allow for reciprocating movement.

However, in many applications, it is necessary that the article being moved back and forth across the rails 22 be moved in a perfect or substantially perfect plane with substantially no movement orthogonal to the linear rail. Since the linear rail 22 is comprised of an upper raceway 26 and parallel lower raceway 28 any departure of the raceways from a uniform distance therebetween, will result in undesirable orthogonal movement of the slider body 24. Even if the linear rail 22 is manufactured perfectly, over a period of time, the upper raceway 26 and lower raceway 28 can deflect out of a perfect plane due to excessively high loads, shock loads, or thermal expansion. The present invention therefore provides a slider body 24 with a mechanism for ensuring contact of the rollers of the slider body with upper raceway 26 and lower raceway 28.

Figure 2:
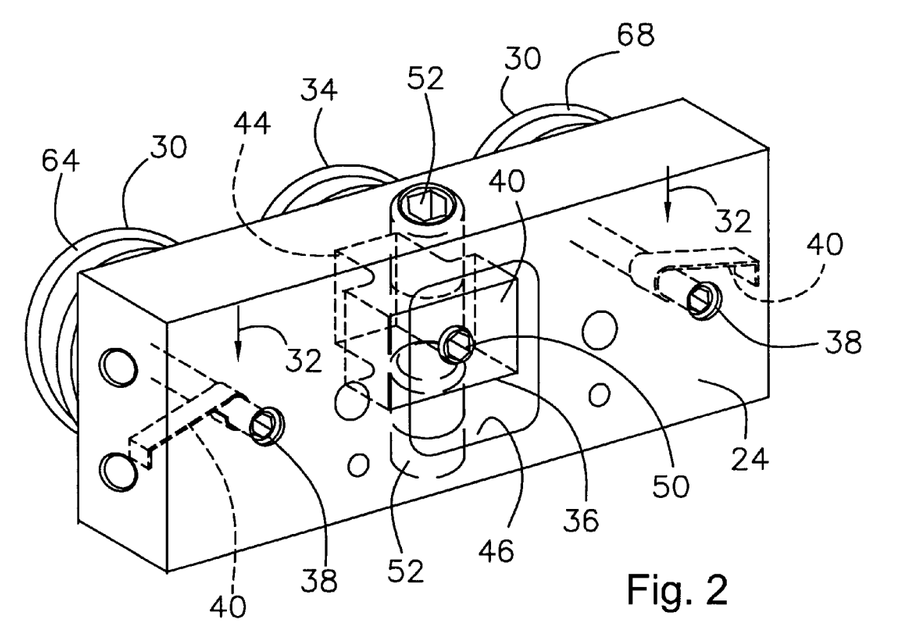
FIG. 2 is a perspective view of the slider body of the preferred embodiment of the present invention.

Referring now to FIG. 2, it can be seen that in the preferred embodiment of the present invention, slider body 24 accomplishes this objective by providing two rollers 30 which are mechanically biased in a downward direction indicated by arrow 32 and a middle roller 34 which is adjustable in the vertical direction by adjustment block 36.

Turning first to outside rollers 30, it can be seen that each roller is mounted onto shaft 38 with shaft 38 being attached to slider body 24 by a mechanical spring 40. It is to be understood that this selection of elements is only used in the preferred embodiment, and that in alternative embodiments, there are other types of biasing means that can be used to generate a downward force upon rollers 30. It is also to be understood that in the preferred embodiment only three rollers are used for each slider body 24, but that in alternative embodiments, a different number of rollers can certainly be employed with equal efficacy using the same basis of the present invention.

Figure 3:
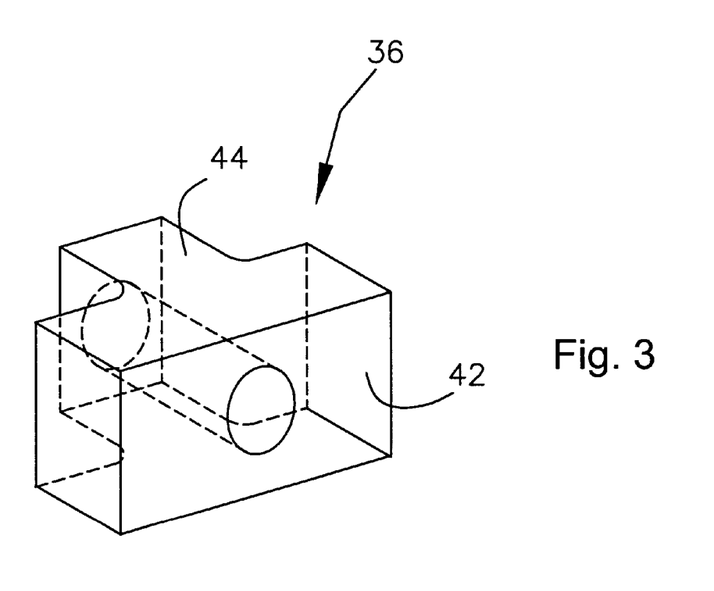
FIG. 3 is a perspective view of the adjustment block of the preferred embodiment of the present invention.
Figure 4:
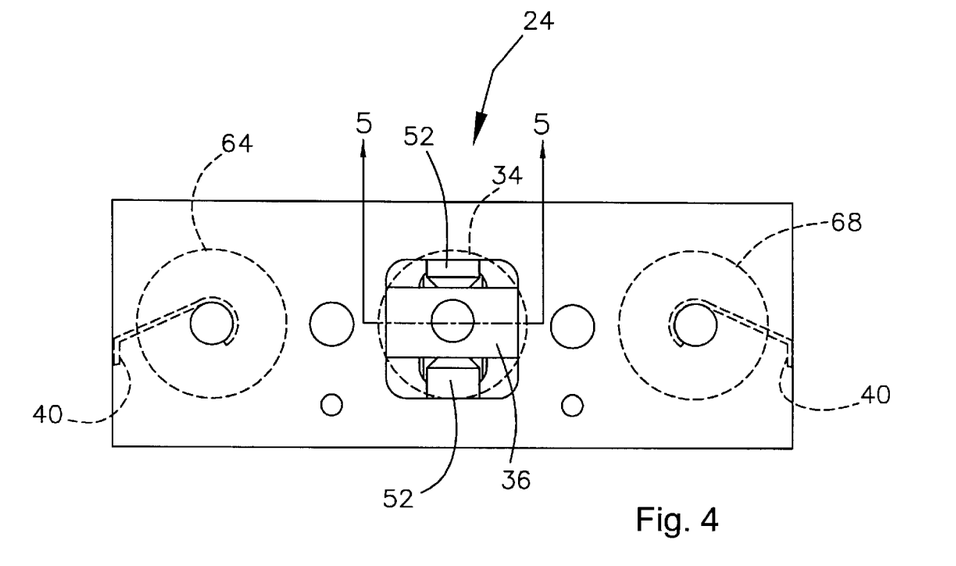
FIG. 4 is a side view of the slider block.
Figure 5:
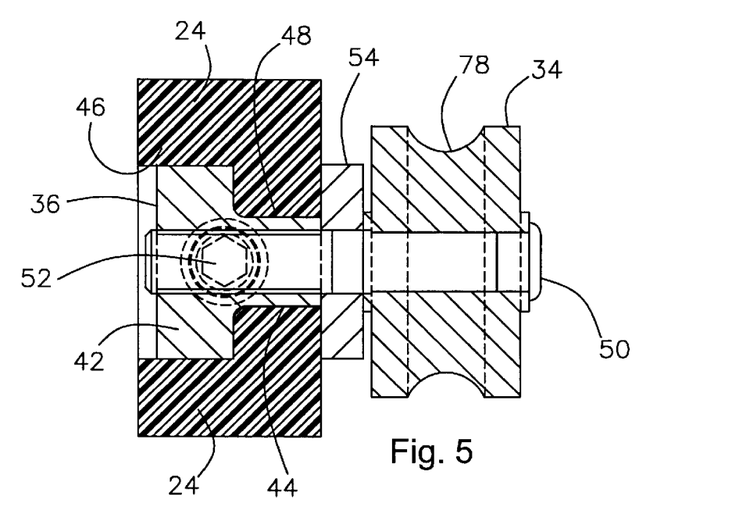
FIG. 5 is a cross-sectional view of the slider body taken along line 5—5 of FIG. 2.

Turning now to the structure of adjustment block 36, it can be seen from FIG. 3 that it is a substantially "T" shaped block having planar portion 42 and rearwardly extending leg 44. Planar portion 42 is sized to fit into notch 46 of slider body 24, while leg 44 is proportionately smaller in size to fit into vertical slot 48 (FIG. 5). In so doing, adjustment block 36 is adapted for vertical movement as leg 44 slides within slot 48. By moving adjustment block 36 in a vertical direction, roller 34 is also moved in a vertical direction since middle roller 34 is attached to adjustment block 36 using stud 50. The relative position of adjustment block 36 within notch 46 can be adjusted using set screws 52. More specifically, by rotation of one set screw 52 in a clockwise direction and the other set screw 52 in a counter-clockwise direction, the position of adjustment block 36 can be modified. The asjustment block 36, and/or the notch 46 and slot 48 may be coated with a substance having a low coefficient of friction to facilitate adjustment of the adjustment block 36. For the sake of complete clarity, it can be seen from FIG. 5 that a spacer or washer 54 separates roller 34 from adjustment block 36 and from slider body 24. In alternative embodiments, position adjustment means other than set screws can be employed, such as wedges, cams, spacers, solenoids, piezoelectric mechanisms, rack and pinion and springs.

In so doing, the present invention provides a mechanism by which contact between rollers 30 and roller 34 with lower raceway 28 and upper raceway 26, respectively, can be ensured regardless of the parallelism between upper raceway 26 and lower raceway 28. Moreover, by attaching rollers 30 to slider body 24 using mechanical springs 40 a certain degree of elasticity is provided which enables the slider body 24 to absorb considerable shock loads. It is to be understood that while the preferred embodiment uses mechanical springs 40 manufactured from metal, any type of elastomeric material can be used provided it has sufficient rigidity to support the weight to be carried by slider body 24.

In addition, by providing middle roller 34 on adjustment block 36, the entire system 20 can be preloaded to ensure proper functioning of the system. With the proper amount of preload, the slide system can add rigidity but still maintain a smooth actuation and low co-efficient of friction. A properly set, rigid preload setting is difficult to manufacture into a slide system because of, inter alia, tolerance stack ups, so a means of adjusting the preload is necessary. Moreover, by providing a small gap between the bottom of the adjustment block and rolling device the rolling device is tightened against the housing material and not the adjustment block. This creates a very rigid mount for the rolling device.

Figure 7:
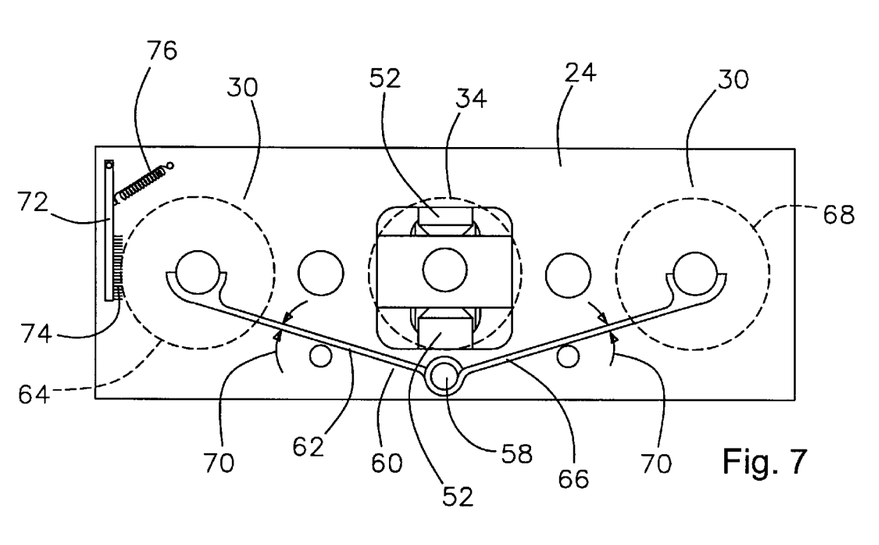
FIG. 7 is a side view of an alternative embodiment of the present invention.

Turning now to an alternative embodiment, attention is directed to FIG. 7 which depicts a side view of alternative slider body 24. The alternative embodiment uses the identical adjustment block arrangement discussed above, but provides a different means for elastically mounting outside rollers 30. In the alternative embodiment, rollers 30 are mounted using a coil spring mounted about pivot 58. The coil spring 60 has first leg 62 adapted to mount first roller 64, while coil spring 60 also has a second leg 66 for mounting a third roller 68 as indicated by bi-directional arrows 70. First roller 64 and third roller 68 are therefore allowed a certain degree of vertical play to accept fairly substantial shock loads.

Figure 6:
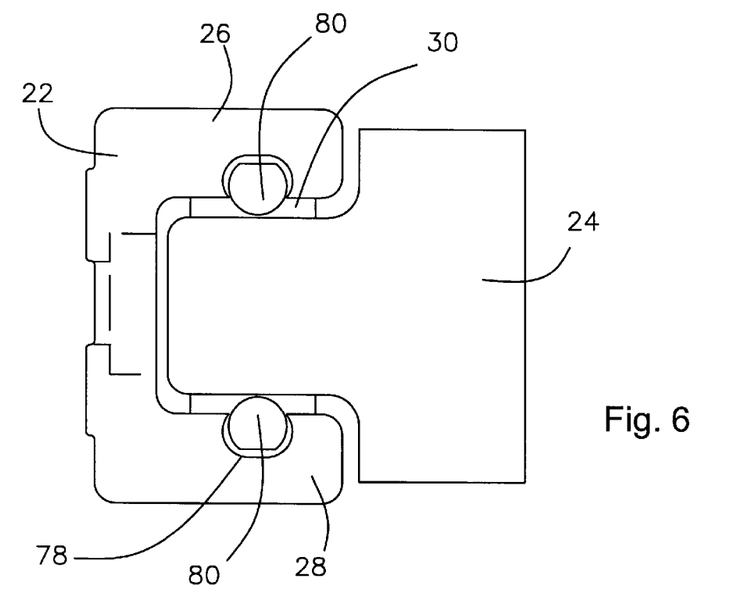
FIG. 6 is an end view of the embodiment shown in FIG. 1.

Also in the alternative embodiment, a brush 72 is provided with abrasive surface 74 to clean rollers 30. It can be seen that brush 72 is spring biased toward rollers 30 using spring 76 to ensure proper and sufficient load against rollers 30 for adequately cleaning purposes. This is of importance, because as can be seen from FIGS. 5 and 6, each roller 30 is provided with an annular groove 78 which is sized to receive hardened raceway insert 80. Any contaminants provided between the roller and raceway will necessarily effect the accuracy of the linear slide system 20.

As indicated above, one factor which can effect the accuracy of the system 20 is rail misalignment or loss of parallelism due to use over time. One feature which the present invention provides to avoid such expansion is the use of hardened raceway inserts 80. In the preferred embodiment of the present invention the raceways are manufactured of hardened steel while rollers are manufactured with 52100 steel. Rails 22 are preferably manufactured of 6061-T6 aluminum as are slider bodies 24.

Figure 8A:
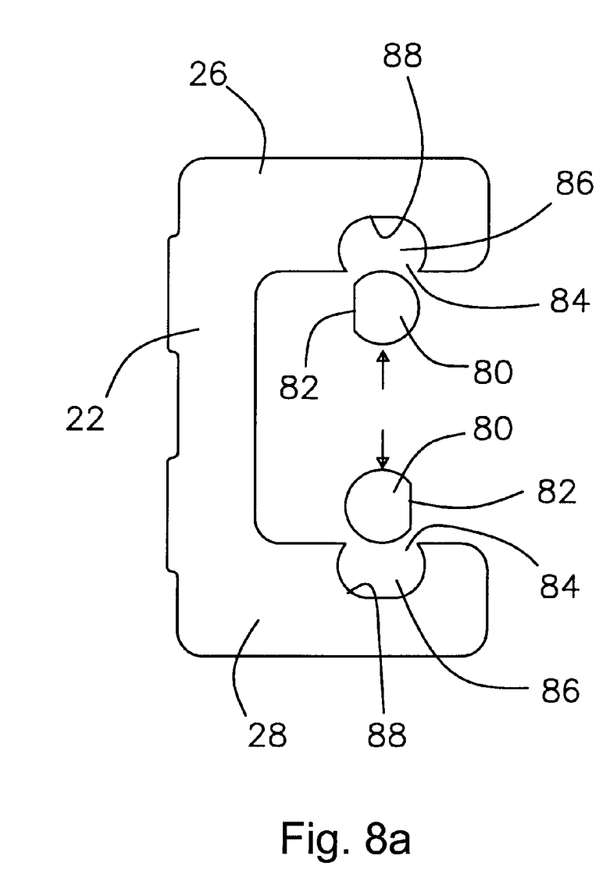
FIG. 8A is an end view of the rail prior to the insertion of the hardened metal raceways.
Figure 8B:
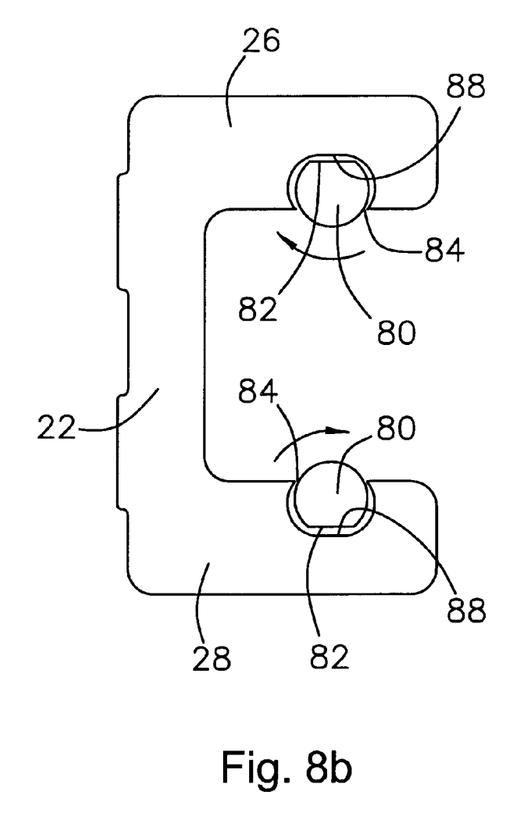
FIG. 8B is an end view of the rail after insertion of the hardened metal raceways.

However, to efficiently and economically manufacture the present invention, FIGS. 8A and 8B depict the manner in which raceway inserts 80 are inserted into rails 22 in the preferred embodiment. As can be seen, inserts 80 are substantially cylindrical but do include a flattened surface 82 such that the diameter of the insert 80 proximate the flattened surface 82 is less than the opening 84 provided in linear rail 22 to channel 86. In addition, the diameter of channel 86 is larger than the diameter of raceway insert 80 even at its largest point to ensure that raceway insert 80 can fit within channels 86. By viewing FIGS. 8A and 8B, it can be readily seen by one of ordinary skill in the art that by rotating raceway insert 80 after insertion into channel 86, the flattened surface 82 can be made to lie against the base 88 of channel 86 with narrowed opening 84 retaining the raceway 80 therein.

Figure 9A:
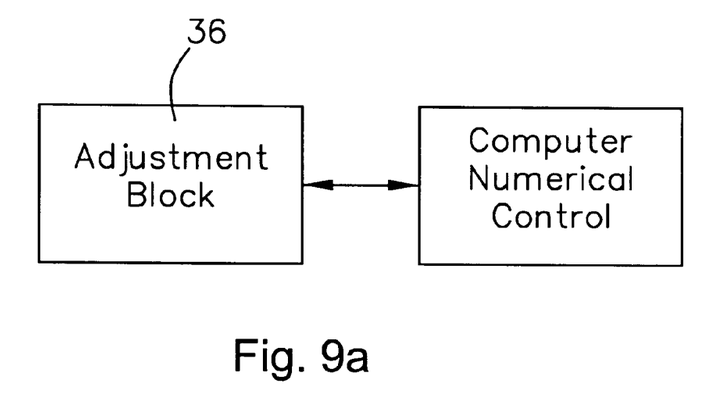
FIG. 9A is a diagram illustrating another embodiment of the present invention.
Figure 9B:
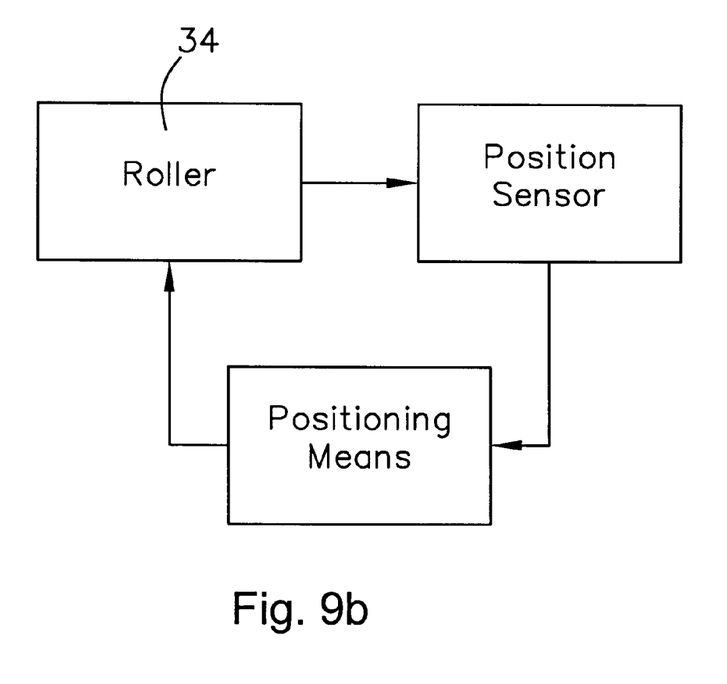
FIG. 9B is a diagram illustrating yet another embodiment of the present invention.
Figure 9C:
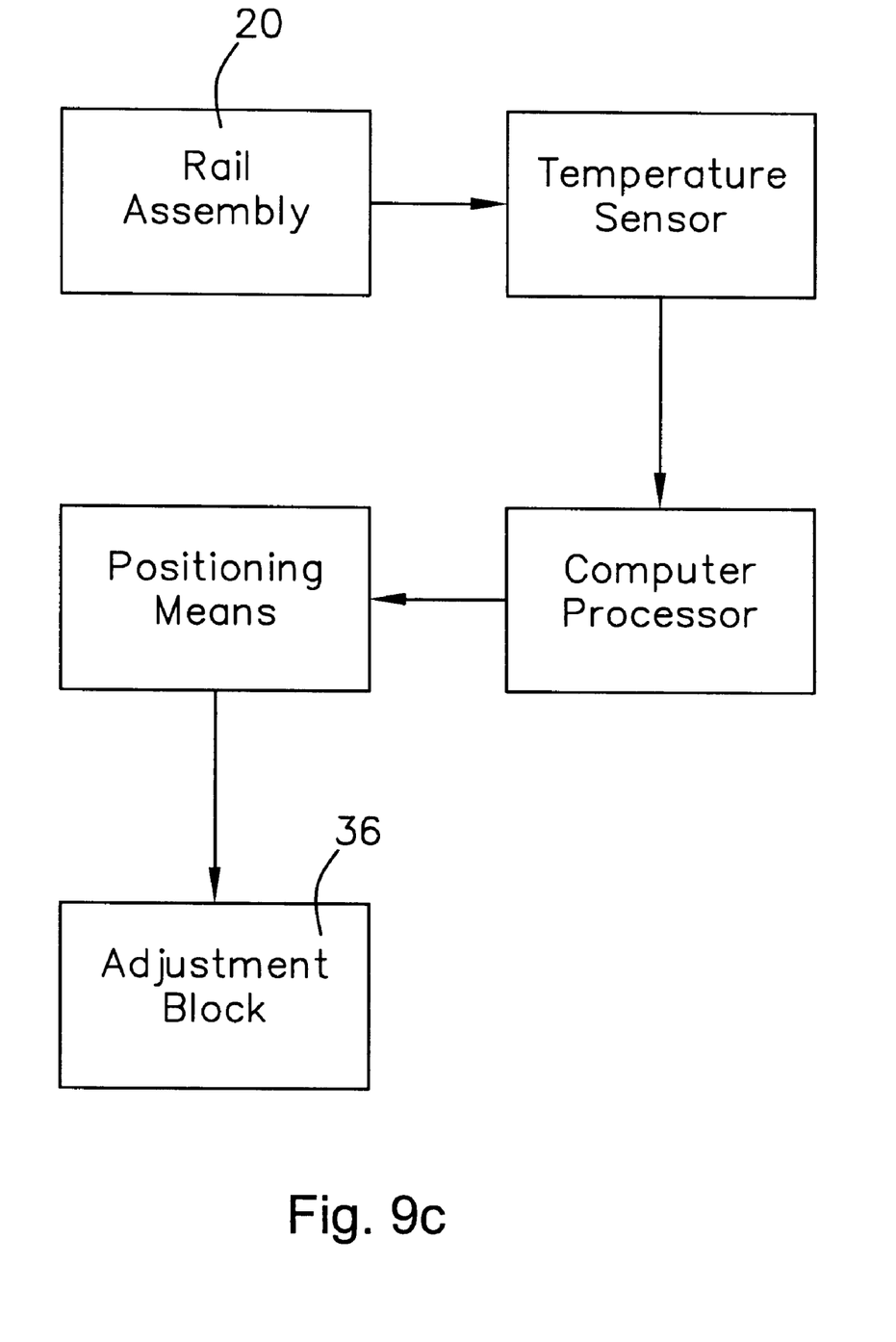
FIG. 9C is a diagram illustrating still another embodiment of the present invention.

In further alternative embodiments, the present invention can be adapted to provide a sensor to detect the actual positions of upper raceway 26, lower raceway 28 and roller 34 (or adjustment block 36), and adjust the position of roller 34 via the asjustment block 36 accordingly. In addition, a temperature sensor, such as a thermocouple can be used to monitor the temperature of raceways 26 and 28 as well as that of rollers to position the based on thermal expansion such that slider body 24 traverses along a substantially uniform plane. Based upon any of these sensors' detections, any of the position adjustment means previously described may be used to position the roller 34 via adjustment block 36, based upon the sensor. For example, and as shown in FIG. 9A, the position of the adjustment block 36 may be monitored and adjusted by computer numerical control. As shown in FIG. 9B, a position sensor can monitor the position of the roller 34 relative to the upper raceway, and means for automatically positioning the block can ensure engagement of the roller 34 to the upper raceway. As shown in FIG. 9C, a temperature sensor may be adapted to monitor the temperature of the rail assembly 20, typically the linear rail 22 or the rollers, and a computer processor may be adapted to receive a signal from the temperature sensor and direct a signal to a means for selectively positioning the block 36 depending on the sensed temperature.

From the foregoing, it can therefore be seen that the present invention provides a new and improved linear slide system with an apparatus for adjusting the preload on the slider body rollers. By adequately adjusting the preload, the slider body will be assured of maintaining a proper plane during operation even if subjected to substantial loads. In addition, by mounting at least one of the rollers using a biasing means, the slider body will be able to handle substantial shock loads as the slider body traverses across linear rail. Moreover, the provision of hardened metal raceway inserts assist with the parallelism of the upper and lower raceways over time.

What is claimed is:

1. A sliding rail assembly, comprising:
an elongated channel having upper and lower parallel raceways, the channel defining an elongated axis;
a slide adapted to linearly translate across the channel;
a first roller attached to the slide and engaging the lower raceway and a second roller attached to the slide, the second roller vertically adjustable and engaging the upper raceway to facilitate the linear translation of the slide means for adjusting the position of the second roller relative to the raceways, the adjusting means fixing the position of the second roller relative to the slide as the second roller is adjusted.

2. The sliding rail assembly of claim 1 wherein the rail assembly further includes a third roller, wherein the first and third rollers are mechanically linked to the slide and biased against the lower raceway of the channel.

3. The rail assembly of claim 1, wherein the upper and lower raceways include grooves disposed therein, the grooves each having a first width at an opening thereof, and a second, larger width beyond the opening; and wherein first and second shafts are provided in the grooves, the shafts being substantially cylindrically shaped, the diameter of the cylinder being greater than the first width of the grooves, the shafts having a flat surface such that the diameter of the shaft in the area of the flat surface is less than the first width of the grooves, the shafts thereby being adapted for insertion into the grooves along the flat surfaces and being retained in the grooves upon rotation.

4. The rail assembly of claim 1, wherein the adjusting means comprises a set screw operatively coupled to the second roller, the rotation of the set screw vertically adjusting the second roller relative to the upper raceway.

5. The rail assembly of claim 4 wherein the set screw is accessible from one of an upper and lower side of the slide for adjusting the second roller.

6. The rail assembly of claim 4, wherein the adjusting means further comprises a second set screw operatively coupled to the second roller and acting in opposition to the first set screw, the rotation of the first and second set screws vertically adjusting the second roller relative to the upper raceway.

7. The rail assembly of claim 1, wherein the second roller is attached to the slide by a block slidably mounted within a grove of the slide, the groove extending orthogonal to the elongated axis, the adjusting means operatively engaging the block.

8. The rail assembly of claim 1, wherein the first roller is mechanically biased against the lower raceway.

9. The rail assembly of claim 8, wherein the first roller is attached to the slide by a mechanical spring which biases the first roller against the lower raceway.

10. A sliding rail assembly, comprising:
an elongated channel having upper and lower parallel raceways, the channel defining an elongated axis;
a slide adapted to linearly translate across the channel;
a plurality of rollers attached to the slide and engaging the upper and lower raceways to facilitate the linear translation of the slide, the plurality of rollers including three rollers, wherein first and third rollers are mechanically linked to the slide and directed against the lower raceway of the channel, and a second roller is provided between the first and third rollers and mechanically linked to the slide, the second roller directed against the upper raceway and wherein the first and third rollers are substantially fixed in position and attached to the slide using mechanical springs, and the second roller is positioned and attached to the slide using an adjustment block adapted to move in a direction orthogonal to the elongated axis of the channel; and means for adjusting the position of the rollers relative to the raceways to ensure engagement with the upper and lower raceways across the length of the channel.

11. The sliding rail assembly of claim 10 wherein the adjustment block is adapted to be secured into position using set screws such that the second roller engages the upper raceway of the slide.

12. The sliding rail assembly of claim 10 wherein the mechanical springs are elastic to serve as shock absorbing devices.

13. The sliding rail assembly of claim 10 wherein the adjustment block is held within a groove of the slide, the groove and block being lubricated to facilitate adjustment of the adjustment block.

14. The sliding rail assembly of claim 10 wherein the position of the adjustment block is monitored and adjusted by computer numerical control.

15. A mechanism for adjusting the position of a roller relative to a linear rail having first and second opposed raceways, the linear rail defining a longitudinal axis, the mechanism comprising:

a slider body adapted to move relative to the linear rail along the longitudinal axis;

a first roller pivotally attached to the slider body by a biasing arm, the biasing arm adapted to generate a force toward the first opposed raceway of the linear rail;

a second roller pivotally attached to the slider body by a block fitted within a groove of the slider body, the groove extending transverse to the longitudinal axis, the block adapted to slide within the groove; and means for securing the block in the slider body groove, the means for securing the block enabling the roller attached to the slider body by the block to be selectively positioned relative to the second opposed raceway.

16. The mechanism of claim 15 further including a third roller attached to the slider body by a second biasing arm.

17. The mechanism of claim 15 wherein the biasing arm is made of elastomeric material to serve as a shock absorbing device.

18. The mechanism of claim 15 wherein the adjustment block is lubricated to facilitate the positioning of the adjustment block.

19. The mechanism of claim 15 further including a position sensor to monitor the position of the second roller relative to the second raceway and means for automatically positioning the block to ensure engagement of the block roller to the second raceway.

20. The mechanism of claim 15 further including a temperature sensor adapted to monitor the temperature of the rail and a computer processor adapted to receive a signal from the sensor and direct a signal to a means for selectively positioning the block depending on the sensed temperature.

* * * * *